May 5, 1936.  J. R. FITZGERALD  2,039,688
TOMATO GRADING AND SIZING MACHINE
Filed March 27, 1935  2 Sheets-Sheet 1
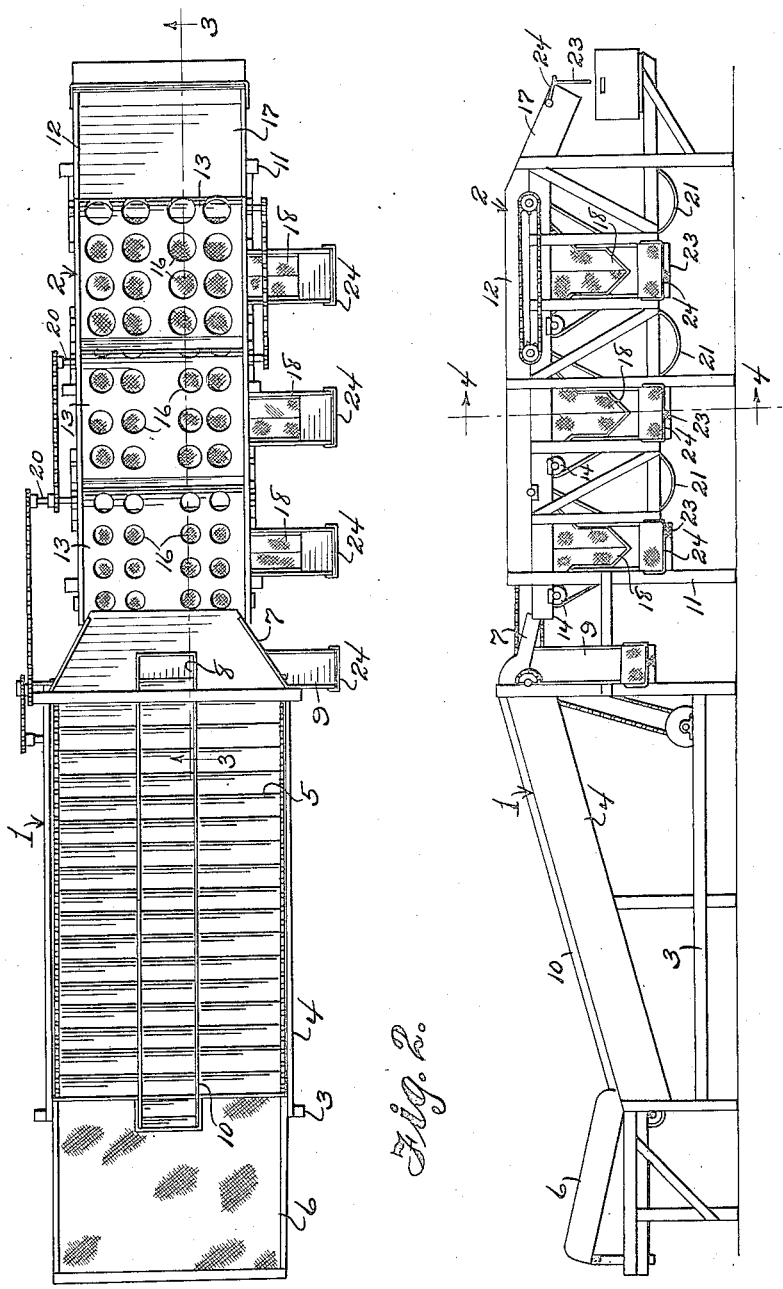
John R. Fitzgerald INVENTOR
BY Victor J. Evans & Co.
ATTORNEY

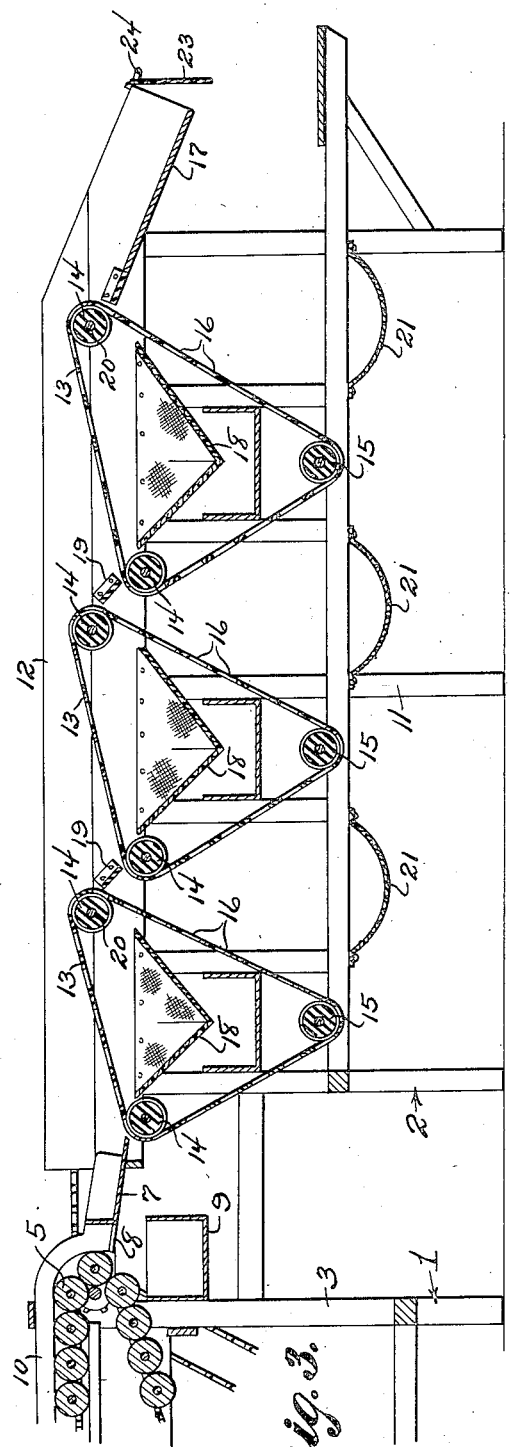
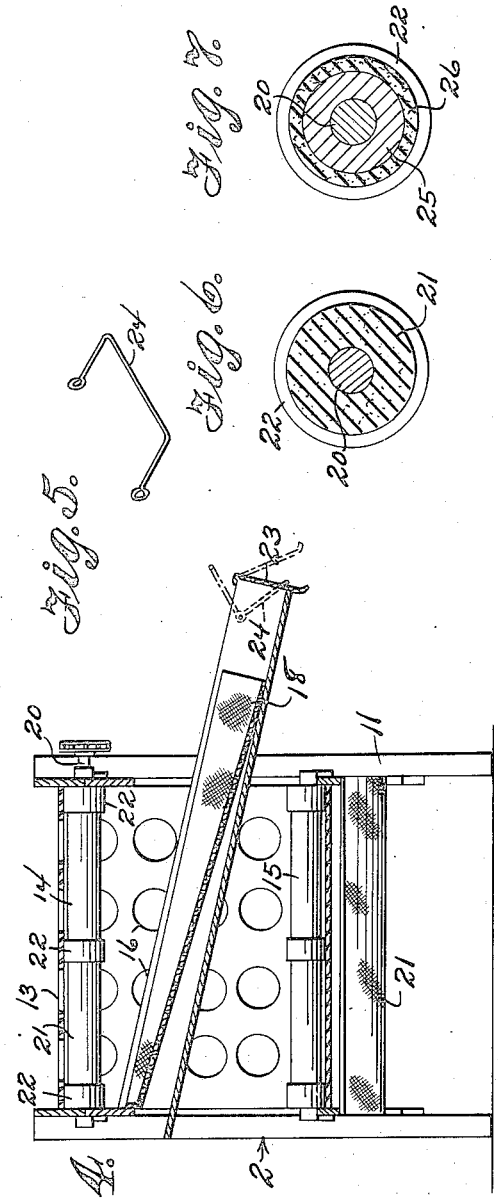

Patented May 5, 1936

2,039,688

UNITED STATES PATENT OFFICE 2,039,688

TOMATO GRADING AND SIZING MACHINE

John R. Fitzgerald, Harlingen, Tex.

Application March 27, 1935, Serial No. 13,356

1 Claim. (Cl. 209—84)

This invention relates to a machine for grading and assorting fruits as to sizes, and has for the primary object the provision of a device of this character whereby persons may readily remove and separate culls from salable or marketable fruits and separate the latter mechanically into groups or lots of selected sizes without the danger of crushing or bruising the fruits.

Another object of the invention is the provision of collecting chutes for directing the graded fruits into containers and having means to act as gates and buffers whereby the chutes may be closed to the containers when desired and normally acting to retard the movement of the fruits from the chutes to the containers to prevent injury to the fruits.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a fruit grading and sizing machine constructed in accordance with my invention.

Figure 2 is a side elevation illustrating the same.

Figure 3 is a sectional view taken on the line 3—3 of Figure 1.

Figure 4 is a transverse sectional view taken on the line 4—4 of Figure 2.

Figure 5 is a perspective view illustrating a retaining device for a combined gate and buffer.

Figure 6 is a transverse sectional view showing one of the conveyor rollers constructed to prevent crushing of the fruit.

Figure 7 is a similar view showing a modified form of roller.

Referring in detail to the drawings, the numeral 1 indicates a culling or grading unit, while the numeral 2 indicates a sizing unit. The unit 1 consists of a supporting structure 3 carrying an inclined table 4 having associated therewith a conveyor 5. The table 4 inclines upwardly from its receiving end to its discharge end and the supporting structure 3 carries a receiving chute or hopper 6 on which fruit may be deposited and gravitate onto the conveyor 5 for movement in the direction of the discharge end of the table 4. The conveyor includes closely related rollers of a length to cover the table 4 when passing thereover. A transfer chute 7 is arranged at the discharge end of the table 4 and has formed in its bottom wall an elongated opening 8 and having in communication therewith a cull chute 9. A cull trough 10 is arranged above the table 4 and extends from the opening 8 to the hopper 6 with the conveyor 5 acting as a bottom wall thereto. During the movement of the fruit from the hopper to the discharge end of the table 4, persons may readily separate the culls from the salable fruit, depositing the culls in the cull trough, the conveyor acting to move the culls to the opening 8 where they pass into the cull chute 9 and may be collected in a suitable container positioned at the discharge end of the cull chute. The salable fruit passes from the table 4 onto the transfer chute 7 where said salable fruit gravitates onto the sizing unit 2.

The sizing unit consists of a supporting structure 11 carrying a horizontally disposed table 12. The table 12 is somewhat of a construction of a trough, the bottom wall being formed by a series of conveyors 13 progressively arranged. Each conveyor is supported by a pair of rollers 14 and a third or lower roller 15. One roller of said pair of rollers 14 is disposed in a plane slightly above the companion roller so that one run of the conveyor will be disposed at an inclination, inclining upwardly from its receiving end to its discharge end. The drawings show the use of three conveyors each having rows of openings 16. However, it is to be understood that the number of conveyors can be increased or decreased to the sizing unit if desired. The conveyor 13 first to be encountered by the salable fruit from the grading unit will have openings of a certain size and smaller than the openings of the next conveyor while the latter-named conveyor will have openings smaller than the openings of the third or final conveyor of the sizing unit.

The discharge end of the table 12 is in the form of a chute 17 and inclined chutes 18 are arranged under the upper runs of the conveyors 13 for receiving the fruits which pass through the openings of said conveyors for delivering the fruits into containers arranged at the discharge end of said chutes. The chutes 18 are preferably constructed of fabric so that the fruit gravitating from the upper runs of the conveyors will be caught and transferred to the collecting containers with the least liability of injury or bruising. Thus it will be seen that during the operation of the sizing unit the salable fruit will be assorted into lots or groups of selected sizes by the arrangement of the conveyors and the fruit of the larger size or the fruit which will not pass through the openings of the final conveyor 13 will be delivered by the chute 17 into a collecting receptacle. Yieldable transverse strips 19 are arranged between the conveyors 13, the purpose of which is to direct the fruit from one of the conveyors 13 to the preceding conveyor. Should fruit become lodged in the openings, the transverse strips will yield when engaged thereby and permit the fruit to pass along with the lower runs of the conveyor without injury.

The rollers 14 of the conveyors each consists of a shaft 20 on which is mounted a cylindrical body 21 constructed from a suitable yielding material, preferably spongy rubber. Rigid collars 22 are mounted on the body 21 and are spaced and form bearing surfaces for the conveyors 13 to engage. The openings 16 in the conveyors are so arranged that they pass about the yieldable body 21, while non-apertured portions of the conveyors contact the rigid collars so that any fruit occupying the openings and not able to pass through said openings will be urged outwardly of the openings by the yieldable body contacting said fruit as the conveyor passes over the roller. This arrangement acts to clear the openings of the conveyors as they pass over the rollers of fruit without danger of bruising or injuring the fruit.

Chutes 21 are carried by the supporting structure 11 directly under the transfer strips 19 for the purpose of catching any fruit which passes from the upper runs of the conveyors 13 to the lower runs thereof. The chutes 21 will only receive such fruits that have become lodged in the openings of the conveyors and are not transferred from one conveyor to the other by the transfer strips 19.

Flaps 23 are arranged at the discharge end of the chutes and are preferably constructed of fabric. Each flap is secured to the upper edge of the chute at the discharge end of the latter so as to depend in front of said discharge end of a chute to act as a buffer for the fruit passing from the chute to the collecting container. Each trough has pivoted thereto a bail 24 which may be positioned to tightly secure the flap over the discharge end of the chute when desiring to close said chute to the collecting container.

The rollers heretofore described may be connected in any suitable way to a drive mechanism, the drawings showing a series of sprocket chains and sprocket wheels for this purpose.

Figure 7 shows a modified form of roller which may be used in place of the rollers 14 consisting of the shaft 20 carrying a cylindrical body 25 on which is mounted the spaced rigid collars 22 and secured to the body 25 between said rigid collars are cushion strips 26.

Having described the invention, I claim:

A fruit assorting machine comprising a supporting frame, groups of rollers journaled to the supporting structure and each group including a pair of rollers and a third roller, conveyors mounted on said rollers and each presenting an upwardly inclined run, said conveyors having openings of selected sizes, chutes carried by the supporting structure to receive fruits passing through the openings of the conveyors, said conveyors adapted to deliver fruits of sizes which will not pass through the openings thereof to the conveyors adjacent thereto, each roller of said pairs of rollers including a shaft, a yieldable body on said shaft to act against fruit lodged in the openings of the conveyors during the movement of the latter over the roller, and rigid collars mounted on said yieldable bodies to contact the non-apertured portions of the conveyors.

JOHN R. FITZGERALD.